US012716872B2

(12) United States Patent
Cho et al.

(10) Patent No.: US 12,716,872 B2
(45) Date of Patent: Aug. 25, 2026

(54) APPARATUS FOR INSPECTING FUEL VESSEL, AND SYSTEM AND METHOD FOR IDENTIFYING CRACK DENSITY OF VESSEL

(71) Applicants: Hyundai Motor Company, Seoul (KR); Kia Corporation, Seoul (KR); Korea Advanced Institute of Science and Technology, Daejeon (KR)

(72) Inventors: Yong Joo Cho, Sejong (KR); Jung Ryul Lee, Daejeon (KR); Kyung Hwan Kim, Daejeong (KR)

(73) Assignees: Hyundai Motor Company, Seoul (KR); Kia Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 369 days.

(21) Appl. No.: 18/459,513

(22) Filed: Sep. 1, 2023

(65) Prior Publication Data

US 2024/0255469 A1 Aug. 1, 2024

(30) Foreign Application Priority Data

Feb. 1, 2023 (KR) ........................ 10-2023-0013749

(51) Int. Cl.

| | |
|---|---|
| ***G01N 29/11*** | (2006.01) |
| ***G01N 29/22*** | (2006.01) |
| ***G01N 29/24*** | (2006.01) |
| ***G01N 29/44*** | (2006.01) |

(52) U.S. Cl.

CPC ........... *G01N 29/223* (2013.01); *G01N 29/11* (2013.01); *G01N 29/2437* (2013.01); *G01N 29/4427* (2013.01); *G01N 2291/0289* (2013.01); *G01N 2291/106* (2013.01)

(58) Field of Classification Search

None

See application file for complete search history.

(56) References Cited

U.S. PATENT DOCUMENTS

| | | | | |
|---|---|---|---|---|
| 11,561,191 | B2 | 1/2023 | Kim | |
| 2014/0312739 | A1* | 10/2014 | Bar-Cohen | G01N 29/223 310/336 |
| 2015/0053009 | A1* | 2/2015 | Yan | G01N 29/46 73/598 |
| 2021/0302348 | A1 | 9/2021 | Kim | |
| 2022/0316967 | A1* | 10/2022 | Burks | G01M 5/0066 |

FOREIGN PATENT DOCUMENTS

| | | | |
|---|---|---|---|
| KR | 10-2021-0120436 | A | 10/2021 |

* cited by examiner

*Primary Examiner* — Suman K Nath

(74) *Attorney, Agent, or Firm* — Fox Rothschild LLP

(57) ABSTRACT

An apparatus for inspecting a fuel vessel includes a strap configured to surround an outer surface of the fuel vessel and fixed to the outer surface through at least one joint part, a plurality of piezoelectric sensors interposed between the outer surface of the fuel vessel and the strap, and spaced apart from each other by a predetermined distance along the strap, and a cable electrically connected to the plurality of piezoelectric sensors. The first piezoelectric sensor of a plurality of piezoelectric sensors is configured to transmit a signal generated based on receiving a voltage applied, to remaining piezoelectric sensors of the plurality of piezoelectric sensors.

17 Claims, 10 Drawing Sheets

APPARATUS FOR INSPECTING FUEL VESSEL, AND SYSTEM AND METHOD FOR IDENTIFYING CRACK DENSITY OF VESSEL

CROSS-REFERENCE TO RELATED APPLICATION

This application claims under 35 U.S.C. § 119(a) the benefit of Korean Patent Application No. 10-2023-0013749, filed in the Korean Intellectual Property Office on Feb. 1, 2023, the entire contents of which are incorporated herein by reference.

BACKGROUND

(a) Technical Field

The present disclosure relates to an apparatus for inspecting a fuel vessel, and a system and method for identifying a crack density of the fuel vessel, more particularly, to the apparatus in which a plurality of piezoelectric sensors are disposed on an outer surface of the fuel vessel, and the crack density (or degree) of the fuel vessel is identified by using an attenuation ratio between response signals generated from the plurality of piezoelectric sensors based on an applied voltage.

(b) Description of the Related Art

A vehicle may be driven based on various fuels. For example, a vehicle (e.g., a hydrogen fuel cell vehicle) has been developed to use hydrogen fuel. The hydrogen fuel cell vehicle may include at least one fuel vessel (or a pressure vessel) to store hydrogen fuel.

The fuel vessel used to store hydrogen fuel may be produced based on various materials. For example, a fuel vessel based on TYPE 4 may be a fuel vessel formed by winding a carbon fiber composition material around anon-metal liner.

The fuel vessel may be exposed to an environment in which expansion and contraction of the fuel vessel are repeated, as hydrogen is charged and/or discharged. Accordingly, a crack may form in the fuel vessel. As the crack is made, the performance of the fuel vessel may be degraded or stability may be degraded in a driving situation of the hydrogen fuel cell vehicle.

According to the related art, it is possible to monitor the performance degradation of a fuel vessel by measuring the strain of the fuel vessel, e.g., by identifying a change in resistance through a conductive filament such as a strain gauge. However, it is difficult to accurately determine a crack degree (or the crack density) made in at least a portion of an outer surface and/or a layer of the fuel vessel by merely monitoring the stain of the fuel vessel.

In addition, although reference information on a possible expiration date and number of available charges may be provided based on experimental data on fuel vessels, cracks in fuel vessels containing composite materials may not be monitored in real time. Accordingly, defects may not be detected in advance.

SUMMARY

The present disclosure provides an apparatus for inspecting a fuel vessel for monitoring the density of a crack made in the fuel vessel in real time by using the size of a response signal (e.g., an ultrasonic signal) generated from a piezoelectric sensor (e.g., a Lead-Zirconium-Titanium oxide (PZT) sensor), and a system and method for identifying a crack density of the fuel vessel.

According to the present disclosure, a difference (or an attenuation ratio) is made between response signals generated from a plurality of piezoelectric sensors due to the distance between the plurality of piezoelectric sensors, and the density (or the degree) of the crack is identified, depending on whether the generated attenuation ratio exceeds a reference attenuation ratio, a system including the same, and a method for the same.

According to the present disclosure, a plurality of piezoelectric sensors are stably mounted on the surface of the fuel vessel by using a strap and/or an adhesion agent (e.g., a polytetrafluoroethylene layer or another fluoropolymer), and the deterioration state of the fuel vessel is easily and stably identified in real time through a radiation signal from the adhering piezoelectric sensor, a system including the same, and a method for the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for inspecting a fuel vessel, may include a strap configured to surround an outer surface of the fuel vessel and fixed to the outer surface through at least one joint part, a plurality of piezoelectric sensors interposed between the outer surface of the fuel vessel and the strap, and spaced apart from each other by a predetermined distance along the strap, and a cable electrically connected to the plurality of piezoelectric sensors. A first piezoelectric sensor of the plurality of piezoelectric sensors may transmit a signal generated based on receiving a voltage applied, to remaining piezoelectric sensors of the plurality of piezoelectric sensors.

According to an embodiment, the strap may be configured to be coupled to the at least one joint part through at least one bolt and fixed to the outer surface of the fuel vessel.

According to an embodiment, the apparatus may further include a polytetrafluoroethylene (PTFE) layer, or other fluoropolymer, disposed on the outer surface of the fuel vessel, and including a plurality of openings spaced apart from each other by a predetermined distance to mount the plurality of piezoelectric sensors.

According to an embodiment, the plurality of openings may be provided in one surface of the polytetrafluoroethylene layer making contact with the outer surface of the fuel vessel.

According to an embodiment, the cable may be interposed between the strap and the plurality of piezoelectric sensors.

According to an embodiment, the plurality of piezoelectric sensors may include the first piezoelectric sensor and a second piezoelectric sensor spaced apart from the first piezoelectric sensor by a longer (e.g., longest) distance, and an angular distance between the first piezoelectric sensor and the second piezoelectric sensor may be less than 180 degrees, when viewed based on a central point of a plan having a hydrogen inlet of the fuel vessel.

According to an embodiment, the apparatus may further include a controller to apply the voltage to the first piezoelectric sensor of the plurality of piezoelectric sensors through the cable and to receive a plurality of response signals generated from the plurality of piezoelectric sensors, respectively.

According to an embodiment, the controller may include a band pass filter to filter the plurality of response signals, at least one amplifier to amplify at least one of the applied voltage, the plurality of response signals, or a combination of the applied voltage or the plurality of response signals, a signal processor to perform signal processing for the plurality of response signals, and a power module to provide the applied voltage.

According to an embodiment, a vehicle may include the above-described apparatus.

According to an aspect of the present disclosure, a system for inspecting a fuel vessel, may include a plurality of piezoelectric sensors disposed on an outer surface of the fuel vessel, to be spaced apart from each other by a predetermined distance, and fixed to the outer surface of the fuel vessel through a strap configured to surround the outer surface of the fuel vessel, a controller electrically connected to the plurality of piezoelectric sensors to apply a voltage to a first piezoelectric sensor of the plurality of piezoelectric sensors, and to receive a plurality of response signals generated to correspond to the applied voltage from at least some piezoelectric sensors of the plurality of piezoelectric sensors, and an analyzer to receive the plurality of response signals from the controller, identify an attenuation ratio between the plurality of response signals, and identify a crack density of the fuel vessel based on a size of the attenuation ratio.

According to an embodiment, the first piezoelectric sensor may transmit, to the at least some piezoelectric sensors included in the plurality of piezoelectric sensors, an ultrasonic wave generated based on the voltage applied from the controller, and the controller may receive the plurality of response signals generated from the at least some piezoelectric sensors included in the plurality of piezoelectric sensors, based on the ultrasonic wave transmitted from the first piezoelectric sensor.

According to an embodiment, the controller may include a band pass filter to filter the plurality of response signals, at least one amplifier to amplify at least one of the applied voltage, the plurality of response signals, or a combination of the applied voltage or the plurality of response signals, a signal processor to perform signal processing for the plurality of response signals, and a power module to provide the applied voltage.

According to an embodiment, the plurality of piezoelectric sensors may include the first piezoelectric sensor and a second piezoelectric sensor spaced apart from the first piezoelectric sensor by a longer (e.g., longest) distance as compared to the other piezoelectric sensors, and an angular distance between the first piezoelectric sensor and the second piezoelectric sensor may be less than 180 degrees, when viewed based on a central point of a plan having a hydrogen inlet of the fuel vessel.

According to an embodiment, the plurality of piezoelectric sensors may be mounted in a plurality of openings provided in one surface of the polytetrafluoroethylene layer disposed on the outer surface of the fuel vessel and making contact with the outer surface of the fuel vessel.

According to an embodiment, the strap may be configured to be coupled to a first joint part and a second joint part coupled to each other through at least one bolt and fixed to the outer surface of the fuel vessel.

According to an embodiment, the controller may transmit the applied voltage to the first piezoelectric sensor, and receive the plurality of response signals from the at least some piezoelectric sensors of the plurality of piezoelectric sensors through a cable electrically connected to the plurality of piezoelectric sensors.

According to an embodiment, the cable may be interposed between the strap and the plurality of piezoelectric sensors.

According to an embodiment, the analyzer may compare a reference attenuation ratio obtained through a hydraulic test in relation to a crack of the fuel vessel, and an attenuation ratio between the plurality of response signals, such that a crack density of the fuel vessel is identified.

According to an embodiment, a system for inspecting a vehicle may include the above-described system.

According to another aspect of the present disclosure, a method for inspecting a fuel vessel, may include applying, by a controller, a voltage to a first piezoelectric sensor of a plurality of piezoelectric sensors disposed to be spaced apart from each other by a predetermined distance on an outer surface of the fuel vessel, receiving, by the controller, a plurality of response signals generated from at least some piezoelectric sensors included in the plurality of piezoelectric sensors, by an ultrasonic wave generated from the first piezoelectric sensor, based on the applied voltage, and identifying, by an analyzer, an attenuation ratio between the plurality of response signals to identify a crack density of the fuel vessel based on a size of the attenuation ratio.

According to an embodiment, the plurality of piezoelectric sensors may include the first piezoelectric sensor and a second piezoelectric sensor spaced apart from the first piezoelectric sensor by a longer (e.g., longest) distance as compared to the other piezoelectric sensors, and an angular distance between the first piezoelectric sensor and the second piezoelectric sensor may be less than 180 degrees, when viewed based on a central point of a plan having a hydrogen inlet of the fuel vessel.

According to an embodiment, the identifying of the crack density of the fuel vessel, by the analyzer may include comparing a reference attenuation ratio obtained through a hydraulic test in relation to a crack of the fuel vessel, and an attenuation ratio between the plurality of response signals, such that a crack density of the fuel vessel is identified.

BRIEF DESCRIPTION OF THE DRAWINGS

The above and other objects, features and advantages of the present disclosure will be more apparent from the following detailed description taken in conjunction with the accompanying drawings.

Figure 1:
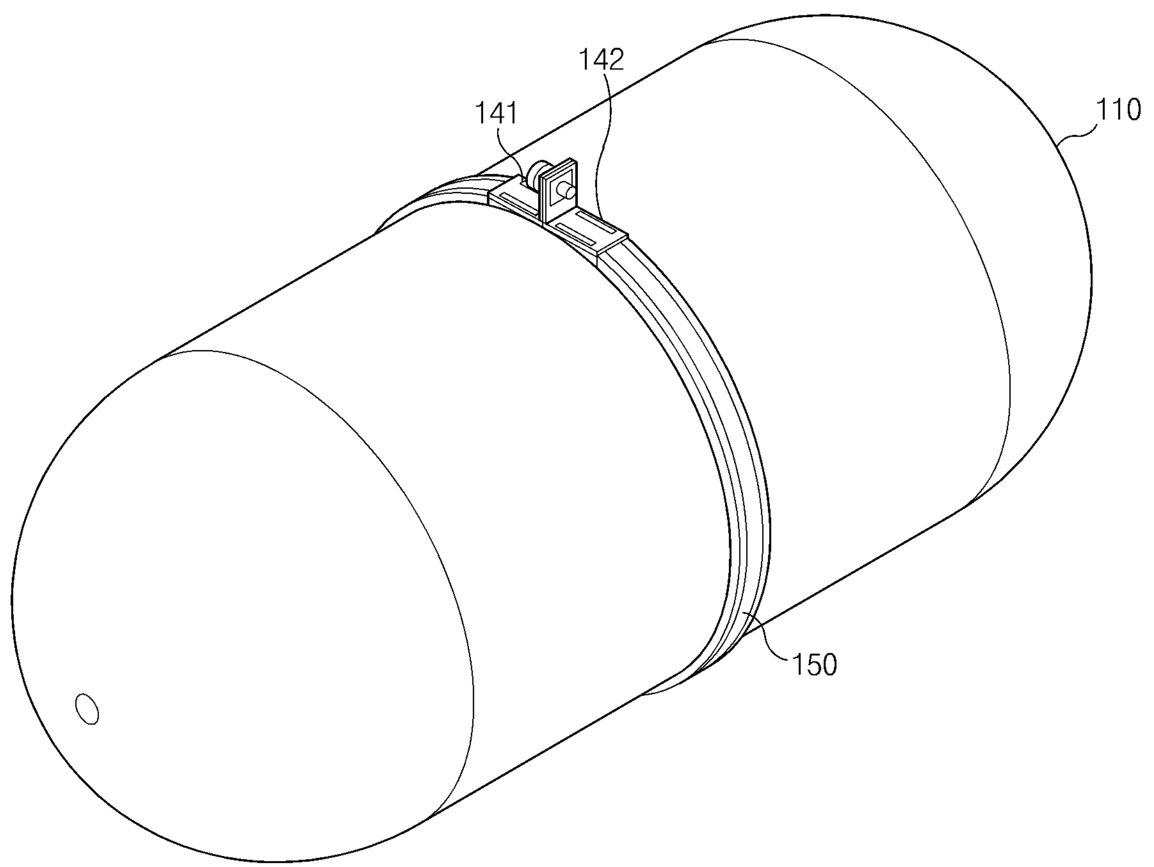
FIG. 1 is a block diagram illustrating a fuel vessel and components of an apparatus for inspecting the fuel vessel, according to an embodiment of the present disclosure.

With regard to description of drawings, the same or similar components will be marked by the same or similar reference signs.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, a detailed description of well-known features or functions will be ruled out in order not to unnecessarily obscure the gist of the present disclosure.

In describing the components of the embodiment according to the present disclosure, terms such as first, second, "A", "B", "(a)", "(b)", and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to FIGS. 1 to 10.

FIG. 1 is a block diagram illustrating a fuel vessel and components of an apparatus for inspecting the fuel vessel, according to an embodiment of the present disclosure.

According to an embodiment, the apparatus for inspecting the fuel vessel may include a strap 150 surrounding an outer surface of a fuel vessel 110.

For example, at least a portion of the strap 150 may be made of aluminum (Al).

The strap 150 may be fixed to the outer surface of the fuel vessel 110 through at least one joint part 141 or 142.

According to an embodiment, the apparatus for inspecting the fuel vessel may include the at least one joint part 141 or 142 configured to fix the strap 150 to the outer surface of the fuel vessel 110.

For example, each of the first joint part 141 and the second joint part 142 may include a coupling part to couple opposite ends of the strap 150 to each other.

For example, the first joint part 141 and the second joint part 142 may be configured to couple the strap 150 through at least one bolt (e.g., and including a nut), and to fix the strap 150 to the outer surface of the fuel vessel 110.

According to an embodiment, the apparatus for inspecting the fuel vessel may include a plurality of layers (e.g., at least one of a layer including a piezoelectric sensor, a layer including polytetrafluoroethylene (PTFE) or other fluoropolymer, a layer including a cable, or the combination thereof) interposed between the strap 150 and the fuel vessel 110. The details of the layer structure will be described later with reference to FIG. 4.

Figure 2:
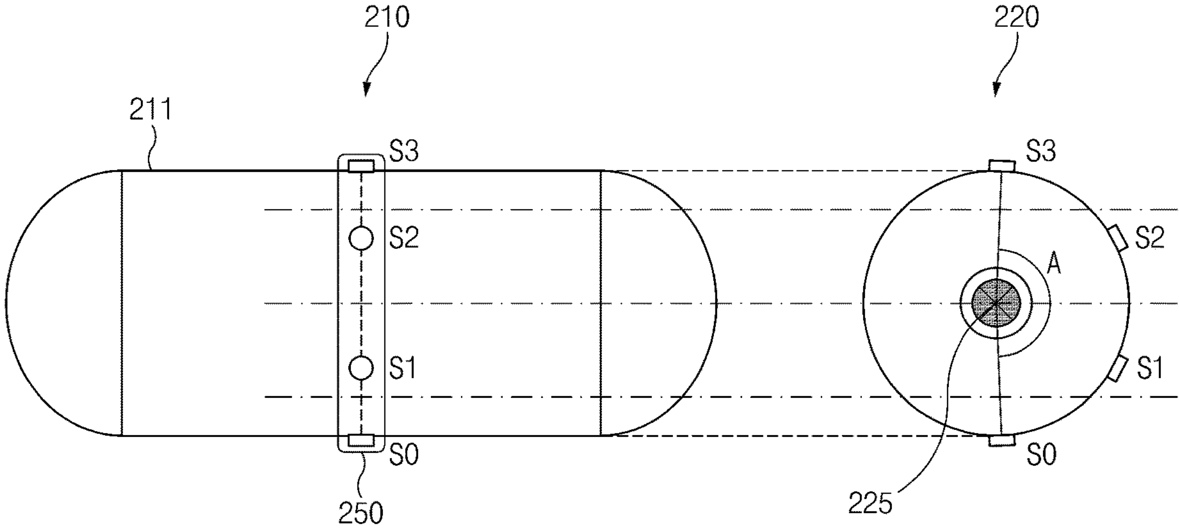
FIG. 2 is a perspective view illustrating a fuel vessel and components of an apparatus for inspecting the fuel vessel, according to an embodiment of the present disclosure.

FIG. 2 is a perspective view illustrating a fuel vessel and components of an apparatus for inspecting the fuel vessel, according to an embodiment of the present disclosure.

Referring to reference numeral 210, according to an embodiment, a fuel vessel 211 (e.g., the fuel vessel 110 of FIG. 1) may be realized in the shape of a cylinder convex in opposite ends thereof.

According to an embodiment, the fuel vessel 211 may be provided on an outer surface thereof with a plurality of piezoelectric sensors S0, S1, S2, and S3 and a strap 250.

Although reference numeral 210 illustrates that the plurality of piezoelectric sensors S0, S1, S2, and S3 are aligned with each other in a vertical direction, embodiments of the present disclosure are not limited thereto.

For example, the plurality of piezoelectric sensors S0, S1, S2, and S3 may be arranged in a zigzag pattern along the strap 250 while being spaced apart from each other left and right.

For example, an additional piezoelectric sensor and an additional strap, which are illustrated in FIG. 2, may be further provided. For example, the fuel vessel 211 may be further provided on the outer surface thereof with a second strap (not illustrated) and an additional piezoelectric sensor spaced apart from the strap 250 and the plurality of piezoelectric sensors S0, S1, S2, and S3 left or right.

For example, the plurality of piezoelectric sensors S0, S1, S2, and S3 may be spaced apart from each other by a predetermined distance.

For example, the distance between the first piezoelectric sensor S0 and the second piezoelectric sensor S1 may be substantially equal to the distance between the second piezoelectric sensor S1 and the third piezoelectric sensor S2.

For example, the distance between the second piezoelectric sensor S1 and the third piezoelectric sensor S2 may be substantially equal to the distance between the third piezoelectric sensor S2 and the fourth piezoelectric sensor S3.

For example, the distances among the plurality of piezoelectric sensors S0, S1, S2, and S3 may be the lengths of arcs which are provided between the piezoelectric sensors and linked with each other along the outer surface of the fuel vessel 211.

Referring to reference numeral 220, according to an embodiment, the angular distances among the plurality of piezoelectric sensors S0, S1, S2, and S3 are substantially equal to each other.

For example, the angular distance between the first piezoelectric sensor S0 and the second piezoelectric sensor S1 may be substantially equal to the angular distance between the second piezoelectric sensor S1 and the third piezoelectric sensor S2.

For example, the angular distance between the second piezoelectric sensor S1 and the third piezoelectric sensor S2 may be substantially equal to the angular distance between the third piezoelectric sensor S2 and the fourth piezoelectric sensor S3.

For example, the first piezoelectric sensor S0 may be at a longer (e.g., the longest) distance from the fourth piezoelectric sensor S3 as compared to the other piezoelectric sensors.

For example, the angular distance 'A' between the first piezoelectric sensor S0 and the fourth piezoelectric sensor S3 may be less than 180 degrees, when viewed based on the central point 225 of a plan having a hydrogen inlet of the fuel vessel 211. In other words, the angular distance between the two adjacent piezoelectric sensors of the plurality of piezoelectric sensors S0, S1, S2, and S3 may be less than 60 degrees.

Figure 3:
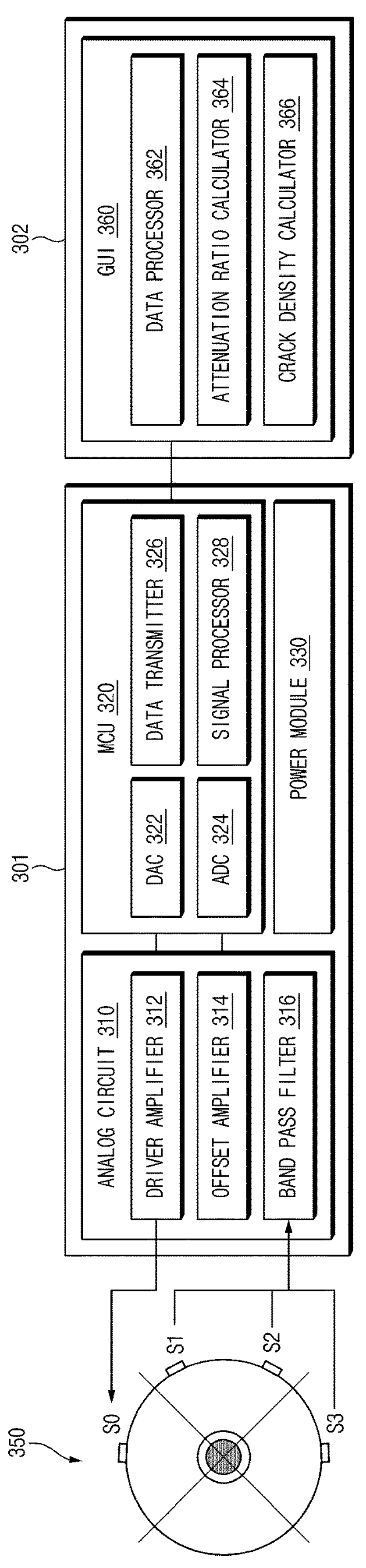
FIG. 3 is a concept view for the operation of a fuel vessel inspecting system for inspecting the fuel vessel, according to an embodiment of the present disclosure.

FIG. 3 is a concept view for the operation of a system for inspecting a fuel vessel, according to an embodiment of the present disclosure.

According to an embodiment, a system (or the fuel vessel inspecting system) for inspecting the fuel vessel may include the plurality of piezoelectric sensors S0, S1, S2, and S3, a controller 301, and an analyzer 302.

According to an embodiment, the plurality of piezoelectric sensors S0, S1, S2, and S3 may be spaced apart from each other by a predetermined distance on an outer surface of a fuel vessel (e.g., the fuel vessel 110 or 211 of FIG. 1 and FIG. 2). For example, the plurality of piezoelectric sensors S0, S1, S2, and S3 may include a Lead-Zirconium-Titanium oxide (PZT) sensor.

For example, the plurality of piezoelectric sensors S0, S1, S2, and S3 may be fixed on the surface of the fuel vessel through a strap (e.g., a strap 140 or 250 in FIGS. 1 and 2) configured to surround the outer surface of the fuel vessel.

According to an embodiment, the controller 301 may include an analog circuit 310 including a driver amplifier 312, an offset amplifier 314, and a band pass filter 316, a micro-control unit (MCU) 320 including a digital-analog converter (DAC) 322, an analog-digital converter (ADC) 324, a data transmitter 326, and a signal processor 328, and a power module 330.

For example, the controller 301 may be electrically connected to the plurality of piezoelectric sensors S0, S1, S2, and S3. For example, the controller 301 may transmit and receive a signal to and from at least some of the plurality of piezoelectric sensors S0, S1, S2, and S3 through a cable.

For example, the controller 301 may apply a voltage to the first piezoelectric sensor S0 among the plurality of piezoelectric sensors S0, S1, S2, and S3. For example, the controller 301 may generate the voltage to be applied using the power module 330, process the generated voltage through the DAC 322, amplify the voltage through the driver amplifier 312, and transmit the voltage to the first piezoelectric sensor S0.

For example, the controller 301 may receive a plurality of response signals, which are generated in response to the applied voltage, from at least some (e.g., the second piezoelectric sensor S1, the third piezoelectric sensor S2, and/or the fourth piezoelectric sensor S3) of the plurality of piezoelectric sensors S0, S1, S2, and S3.

For example, a signal, which is generated from the first piezoelectric sensor S0 based on receiving the applied voltage, may be transmitted to remaining piezoelectric sensors included in the plurality of piezoelectric sensors S0, S1, S2, and S3, and the controller 301 may receive a response signal (e.g., an ultrasonic signal) generated from the remaining piezoelectric sensors.

For example, the first piezoelectric sensor S0 may generate a radiation signal (e.g., ultrasonic waves), based on receiving the applied voltage. The radiation signal generated from the first piezoelectric sensor S0 may be transmitted to the second piezoelectric sensor S1, the third piezoelectric sensor S2, and/or the fourth piezoelectric sensor S3. The second piezoelectric sensor S1, the third piezoelectric sensor S2, and/or the fourth piezoelectric sensor S3 may radiation response signals, based on receiving the radiation signal generated from the first piezoelectric sensor S0.

For example, a piezoelectric sensor having a longer distance from the first piezoelectric sensor S0 may radiate a response signal having a smaller voltage value. For example, the fourth piezoelectric sensor S3 may radiate a response signal having a smaller voltage value, as compared to response signals of the second piezoelectric sensor S1 and the third piezoelectric sensor S2.

For example, the controller 301 may process a plurality of response signals, which are received, through the band pass filter 316.

For example, the controller 301 may process the plurality of response signals through the band pass filter 316 to filter each of the plurality of response signals.

For example, the controller 301 may amplify at least some of the plurality of response signals, which are filtered, through the offset amplifier 341.

For example, the controller 301 may identify and amplify at least some signals, which are required to identify a crack density of the fuel vessel, of the plurality of response signals.

For example, the controller 301 may process the plurality of response signals, which are processed in the analog circuit 310, through the MCU 320 and may transmit the processing result to the analyzer 302.

For example, the controller 301 may convert the plurality of response signals, which are processed in the analog circuit 310, through the ADC 324, post-process the converted result through the signal processor 328, and may transmit the post-processed result to the analyzer 302 through the data transmitter 326.

According to an embodiment, the analyzer 302 may include a graphic user interface (GUI) 360. The GUI 360 may include a data processor 362, an attenuation ratio calculator 364, and/or a crack density calculator 366.

For example, the analyzer 302 may process the plurality of response signals processed and transmitted through the controller 301.

For example, the analyzer 302 may output, in the form of a graph, each response signal included in the plurality of response signals, through the data processor 362.

For example, the analyzer 302 may identify an attenuation ratio between the plurality of response signals by using the attenuation ratio calculator 364, and may identify a crack degree (or crack density) of the fuel vessel using the crack density calculator 366, based on the identified attenuation ratio.

For example, the analyzer 302 may store a reference attenuation ratio obtained through a hydraulic test in relation to a crack of the fuel vessel. The analyzer 302 may identify the crack density of the fuel vessel by comparing, for example, the identified attenuation ratio with the reference attenuation ratio. For example, when the identified attenuation ratio exceeds the reference attenuation ratio, the analyzer 302 may determine that the crack density of the fuel vessel may be a problem with the safety in the use of the fuel vessel.

Figure 4:
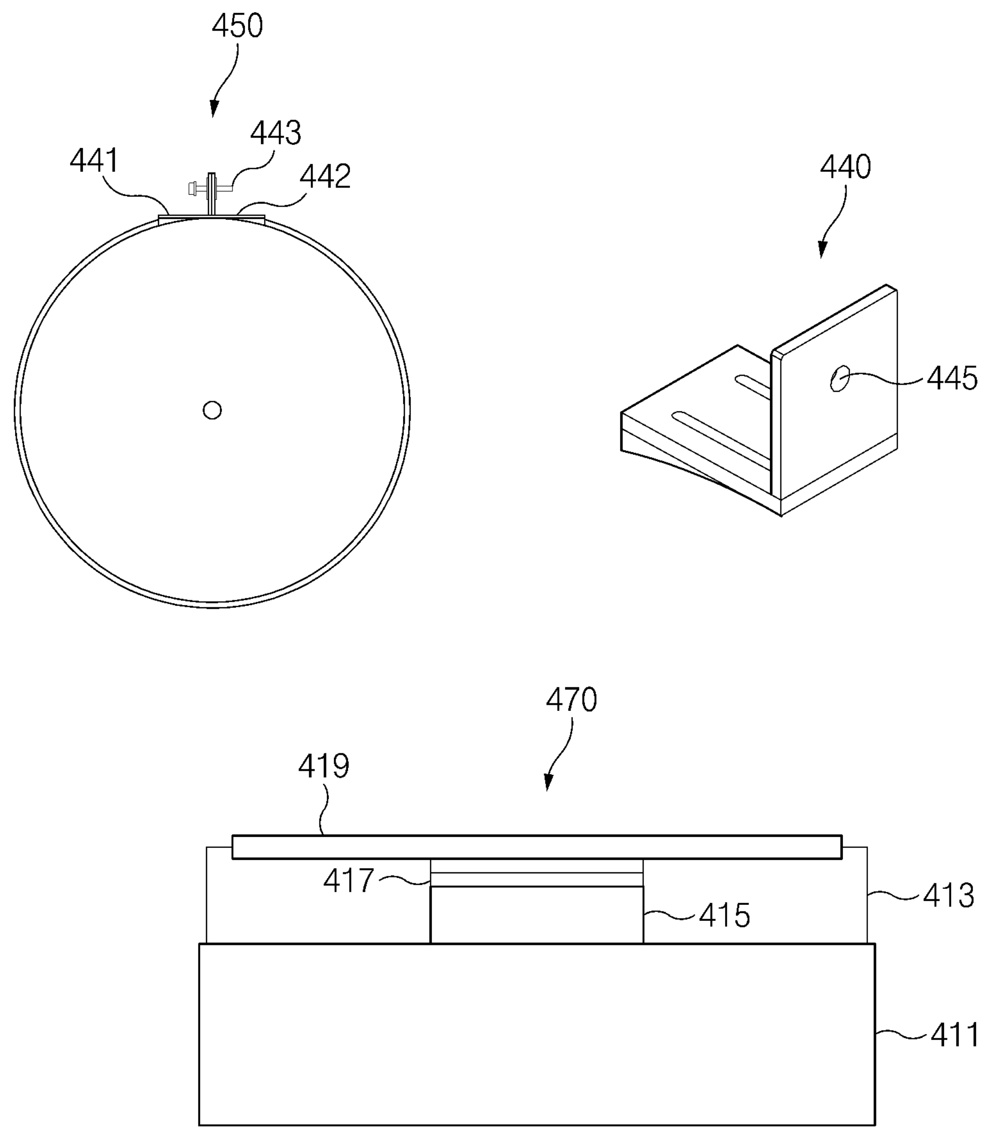
FIG. 4 is a view illustrating a fuel vessel and components of an apparatus for inspecting the fuel vessel, according to an embodiment of the present disclosure.

FIG. 4 is a view illustrating a fuel vessel and components of an apparatus for inspecting the fuel vessel, according to an embodiment of the present disclosure.

Referring to reference numeral 450, according to an embodiment, a strap 419 may be configured to surround an outer surface of the fuel vessel and be fixed to the outer surface through at least one joint part 441 or 442. For example, the plurality of piezoelectric sensors may be arranged to be spaced apart from each other by a predetermined distance along the strap 419, between the strap 419 and the fuel vessel.

For example, the strap 419 are configured to be coupled to the first joint part 441 and the second joint part 442 through at least one bolt and at least one nut, and fixed to the outer surface of the fuel vessel 110.

Referring to reference number 440, according to an embodiment, at least one joint part 441 or 442 may include a coupling part 445 for the coupling of at least one bolt (e.g., and including a nut).

Reference number 470 may illustrate the layer structure of components of the apparatus for inspecting the fuel vessel, according to an embodiment of the present disclosure.

For example, the apparatus for inspecting the fuel vessel may be provided on the outer surface of the fuel vessel 411, and may include a polytetrafluoroethylene (PTFE) layer 413 including a plurality of openings spaced apart from each other by a predetermined distance to mount the plurality of piezoelectric sensors.

For example, the plurality of openings provided in the polytetrafluoroethylene layer 413 may be formed in one surface of the polytetrafluoroethylene layer 413 making contact with the outer surface of the fuel vessel 411.

For example, the piezoelectric sensor 415 may be mounted in the opening provided in the polytetrafluoroethylene layer 413. As the piezoelectric sensor 415 is mounted in the opening, the piezoelectric sensor 415 may be disposed to be fixed to the outer surface of the fuel vessel 411.

For example, the apparatus for inspecting the fuel vessel may further include a cable 417. For example, the cable 417 may be used to transmit or receive a signal between the plurality of piezoelectric sensors and the controller (for example, the controller 301 of FIG. 3).

For example, the cable 417 may be interposed between the strap 419 and the plurality of piezoelectric sensors (for example, the piezoelectric sensor 415), and may be electrically connected to the plurality of piezoelectric sensors and the controller.

For example, the cable 417 may be interposed between the strap 419 and the plurality of piezoelectric sensors.

Figure 5:
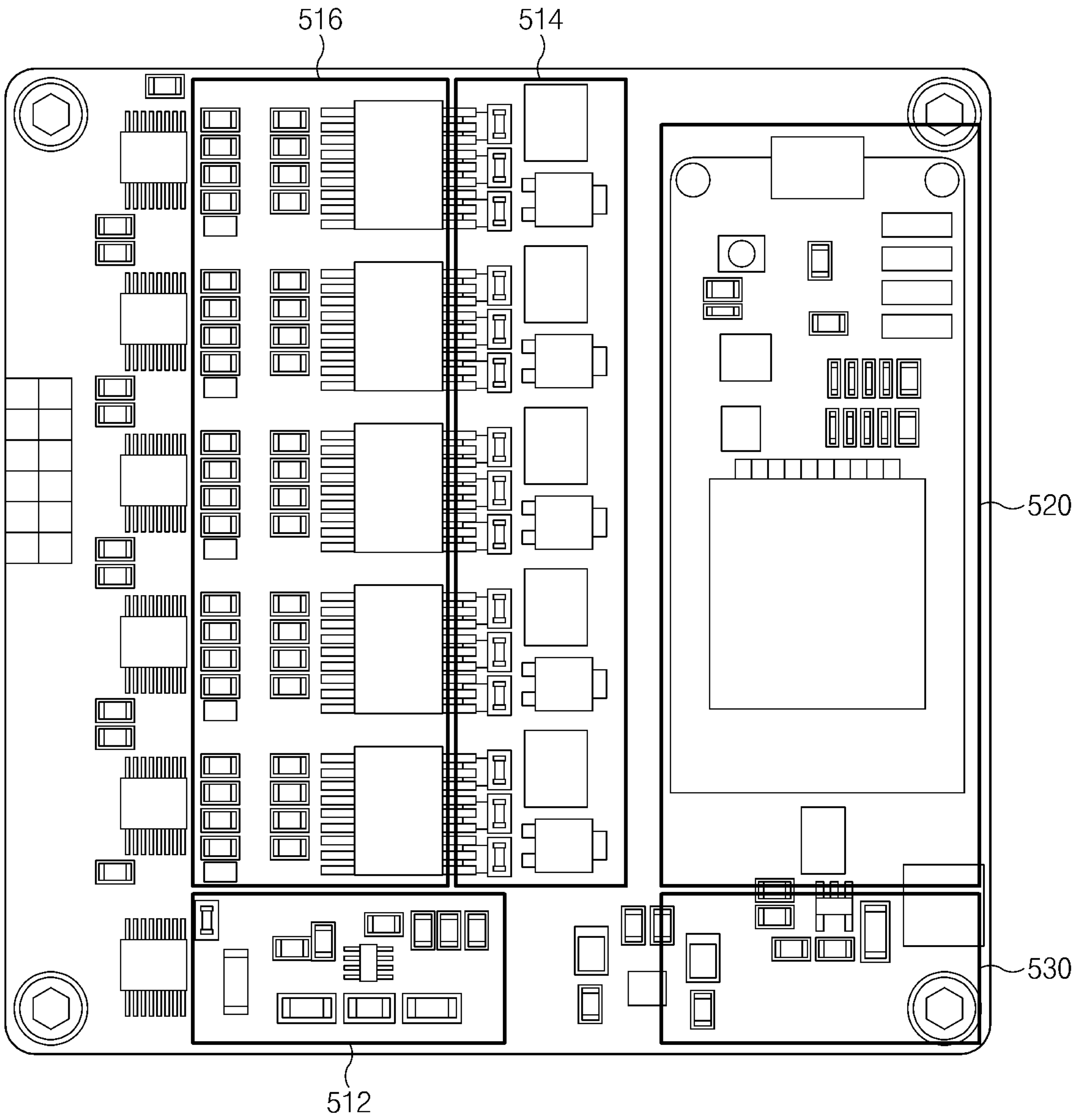
FIG. 5 is a circuit diagram included in the controller, according to an embodiment of the present disclosure.

FIG. 5 is a circuit diagram included in the controller, according to an embodiment of the present disclosure.

According to an embodiment, the controller (e.g., the controller 301 of FIG. 3) may include at least one circuit.

For example, the controller may include a band pass filter 516 (e.g., the band pass filter 316) to filter a plurality of response signals radiated from at least some sensors of the plurality of piezoelectric sensors.

For example, the controller may include at least one amplifier to amplify at least one of a voltage applied to a specific piezoelectric sensor (e.g., the first piezoelectric sensor S0 of FIG. 2) of the plurality of piezoelectric sensors, a plurality of response signals, or the combination thereof.

For example, the controller may amplify at least some of the plurality of response signals to process a signal through an MCU 520 (e.g., the MCU 320 of FIG. 3) by using an offset amplifier 514 (e.g., the offset amplifier 314 of FIG. 3).

For example, the controller may amplify a voltage applied to a specific piezoelectric sensor of the plurality of piezoelectric sensors by using a driver amplifier 512 (e.g., the driver amplifier 312 of FIG. 3).

For example, the controller may include an MCU 520 (or a signal processor) to process a signal for the plurality of response signals.

For example, the MCU 520 may include at least one converter (e.g., the DAC 322 and the ADC 324 of FIG. 3), the signal processor 328, and the data transmitter 326.

For example, the controller may include a power module 530 (e.g., the power module 330 of FIG. 3).

For example, the controller may generate a voltage to be applied to the piezoelectric sensor through the power module 530. The power module 530 may generate the voltage to be applied having the size of 5 V and/or 30 V. The number of piezoelectric sensors is provided for illustrative purposes only, and is not intended to limit the present disclosure.

Figure 6:
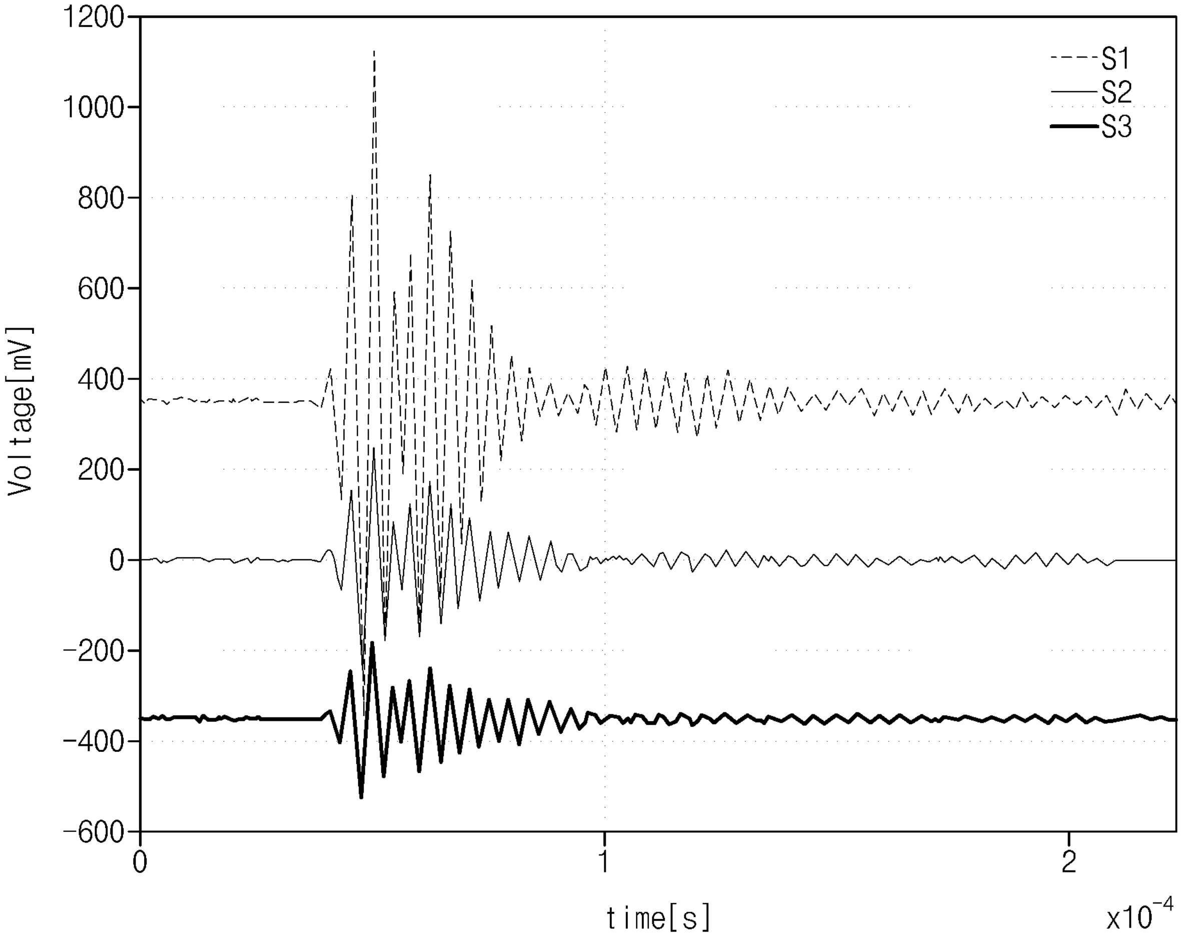
FIG. 6 is a graph illustrating a response signal radiated from at least some of a plurality of piezoelectric sensors, according to an embodiment of the present disclosure.

FIG. 6 is a graph illustrating a response signal radiated from at least some of a plurality of piezoelectric sensors according to an embodiment of the present disclosure.

According to an embodiment, the at least some of the plurality of piezoelectric sensors may receive a radiation signal (e.g., the ultrasonic wave) radiated based on that the first piezoelectric sensor (e.g., the first piezoelectric sensor S0 of FIG. 2) receives the voltage to be applied, and may radiate each response signal illustrated in FIG. 6.

For example, the second piezoelectric sensor S1 may radiate a response signal having an average voltage value of about 380 mV and transmit the response signal to the controller (e.g., the controller 301 of FIG. 3) through a cable (e.g., the cable 417 of FIG. 4).

For example, the third piezoelectric sensor S2 may radiate a response signal having an average voltage value of about 0 mV and transmit the response signal to the controller through a cable.

For example, the fourth piezoelectric sensor S3 may radiate a response signal having an average voltage value of about −380 mV and transmit the response signal to the controller through a cable.

As illustrated in FIG. 6, a piezoelectric sensor having a longer distance from the first piezoelectric sensor may radiate a response signal having a smaller voltage value.

For example, an average voltage value of a response signal radiated from the fourth piezoelectric sensor S3 may be smaller than a voltage value of the response signal from the second piezoelectric sensor S1 and the third piezoelectric sensor S2.

For example, the analyzer (e.g., the analyzer 302 of FIG. 3) may identify an attenuation ratio between the plurality of response signals and may identify a crack density (or crack degree) of the fuel vessel, based on the size of the attenuation ratio.

For example, when the difference in voltage value between response signals of the piezoelectric sensors exceeds a specific value, the fuel vessel inspecting system may determine that the crack density of the fuel vessel corresponds to a dangerous degree in using the fuel vessel.

In other words, the analyzer may compare the size of the attenuation ratio between the plurality of response signals with the size of the previously stored reference attenuation ratio to identify the dangerousness to the crack density (or degree) of the fuel vessel.

For example, the reference attenuation ratio may be an experimental data value obtained by repeating a hydraulic test in relation to the crack in the fuel vessel.

For example, the analyzer may, in real time, update and store the experimental data value newly generated by repeating the hydraulic test.

Figure 7:
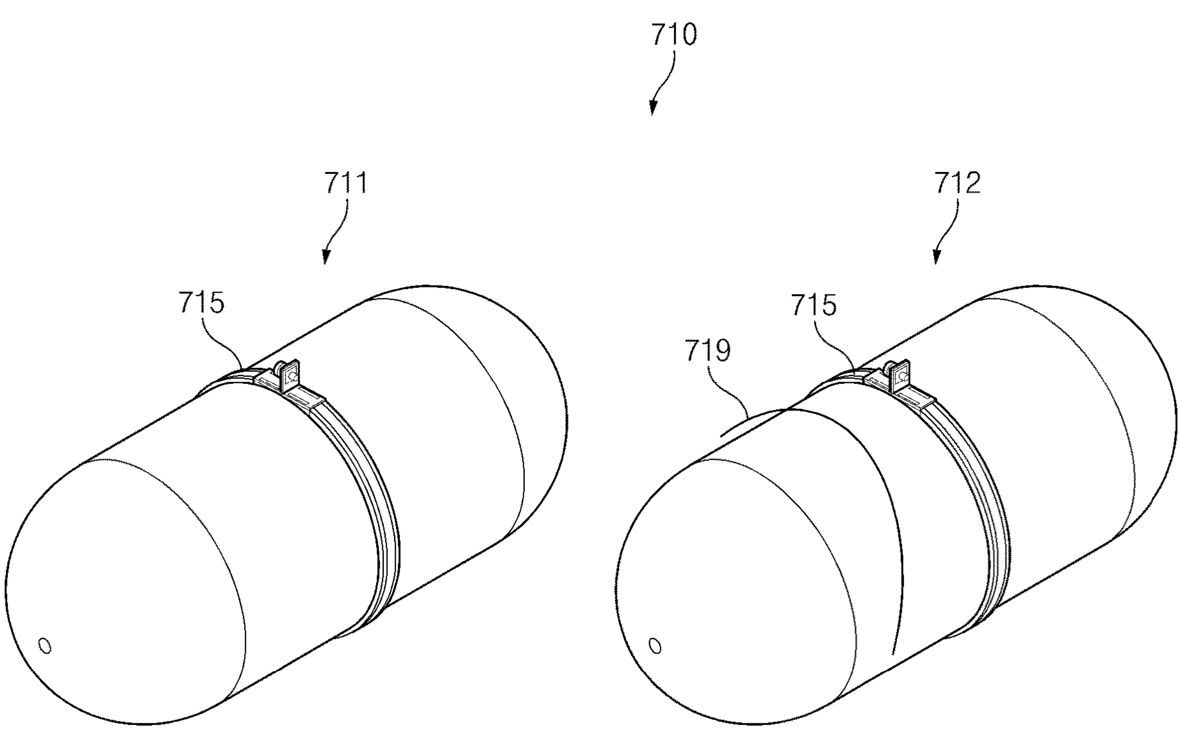
FIG. 7 is a view illustrating a fuel vessel and components of an apparatus for inspecting the fuel vessel, according to an embodiment of the present disclosure.

FIG. 7 is a view illustrating a fuel vessel and components of an apparatus for inspecting the fuel vessel, according to an embodiment of the present disclosure.

Referring to reference numeral 710, according to an embodiment, a plurality of piezoelectric sensors may be fixed to the outer surface of a fuel vessel using at least one strap.

According to an embodiment, referring to reference numeral 711, the apparatus for inspecting the fuel vessel may fix a plurality of piezoelectric sensors through a single strap 715, According to an embodiment, referring to reference numeral 712, the apparatus for inspecting the fuel vessel may further fix the plurality of piezoelectric sensors on the outer surface of the fuel vessel through an additional strap 719 in addition to the strap 715.

Figure 8:
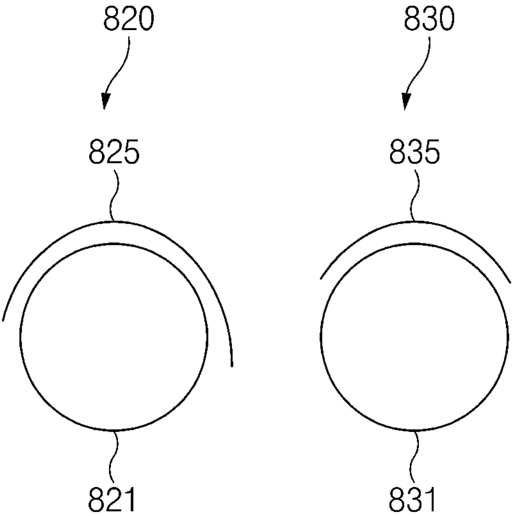
FIG. 8 is a view illustrating a fuel vessel and components of an apparatus for inspecting the fuel vessel, according to an embodiment of the present disclosure.

FIG. 8 is a view illustrating a fuel vessel and components of an apparatus for inspecting the fuel vessel, according to an embodiment of the present disclosure.

According to an embodiment, the strap included in the apparatus for inspecting the fuel vessel may be provided to surround at least a portion of the outer surface of the fuel vessel.

Referring to reference numeral 820, according to an embodiment, a strap 825 may be provided in a half-moon shape to surround the outer surface of a fuel vessel 821.

Referring to reference numeral 830, according to an embodiment, a strap 835 may be provided in a hair band to surround the outer surface of a fuel vessel 831.

The shape of the straps 825 and 835 illustrated in FIG. 8 is provided for illustrative purposes only, and the present disclosure is not limited thereto.

Figure 9:
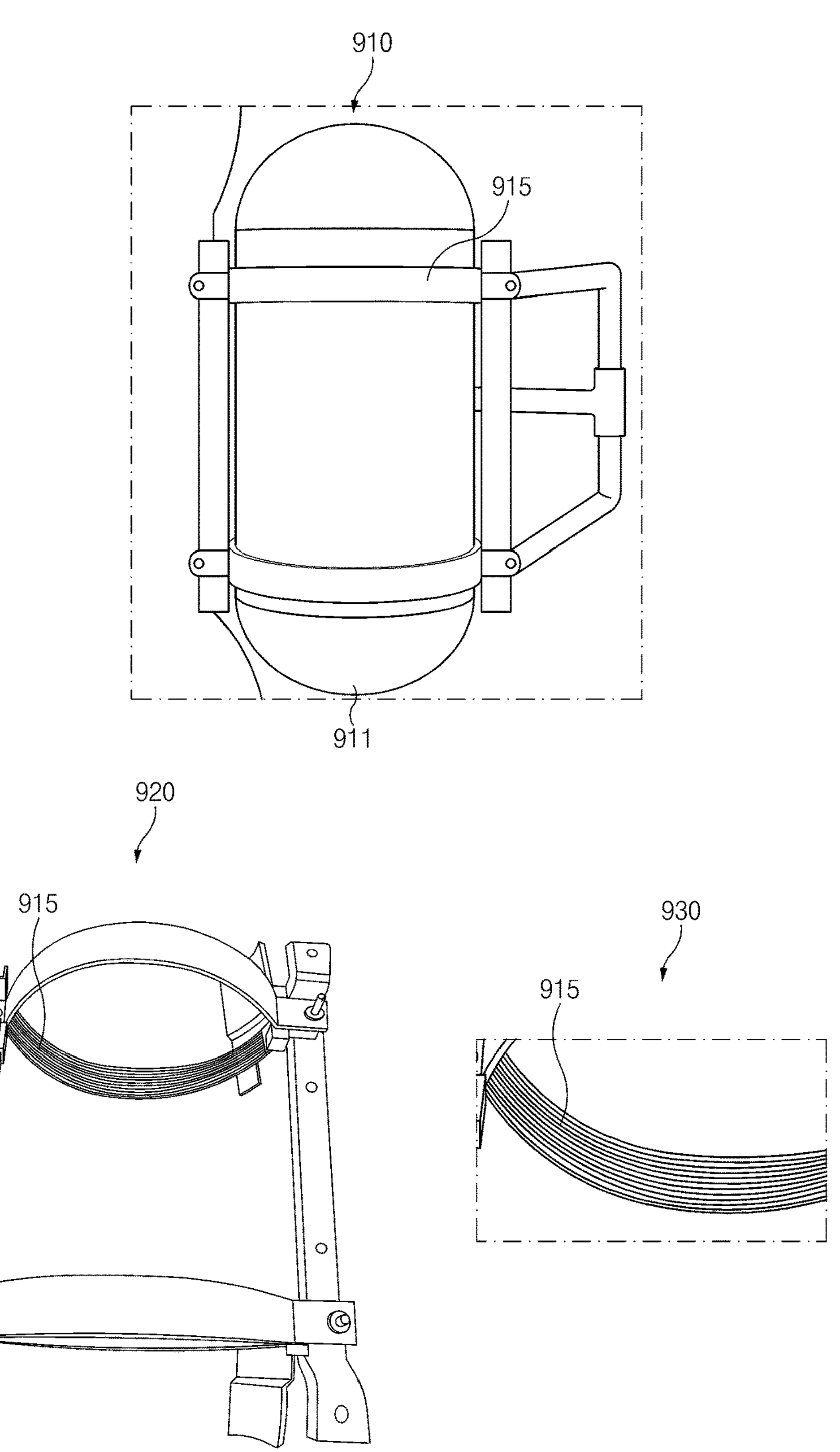
FIG. 9 is a view illustrating a fuel vessel and components of an apparatus for inspecting the fuel vessel, according to an embodiment of the present disclosure.

FIG. 9 is a view illustrating a fuel vessel and components of an apparatus for inspecting the fuel vessel, according to an embodiment of the present disclosure.

Referring to reference numeral 910, according to an embodiment, a fuel vessel 911 may be mounted inside the vehicle through a fixed frame 915. In this case, a plurality of piezoelectric sensors may be attached to an outer surface of the fuel vessel 911 by using the fixed frame 915 to fix the fuel vessel 911.

Referring to reference numeral 920, according to an embodiment, a space (e.g., an opening) for mounting the plurality of piezoelectric sensors are to be mounted may be formed through metal machining for an inner surface of the fixed frame 915, which makes contact with the fuel vessel 911.

Reference numeral 930 may illustrates an enlarged view of the inner surface of the fixed frame 915. Referring to reference numeral 930, an opening may be formed in the inner surface of the fixed frame 915. The apparatus for inspecting the fuel vessel may be realized in the structure in which the plurality of piezoelectric sensors are provided in at least one opening and the fuel vessel 911 is mounted through the fixing frame 915.

Figure 10:
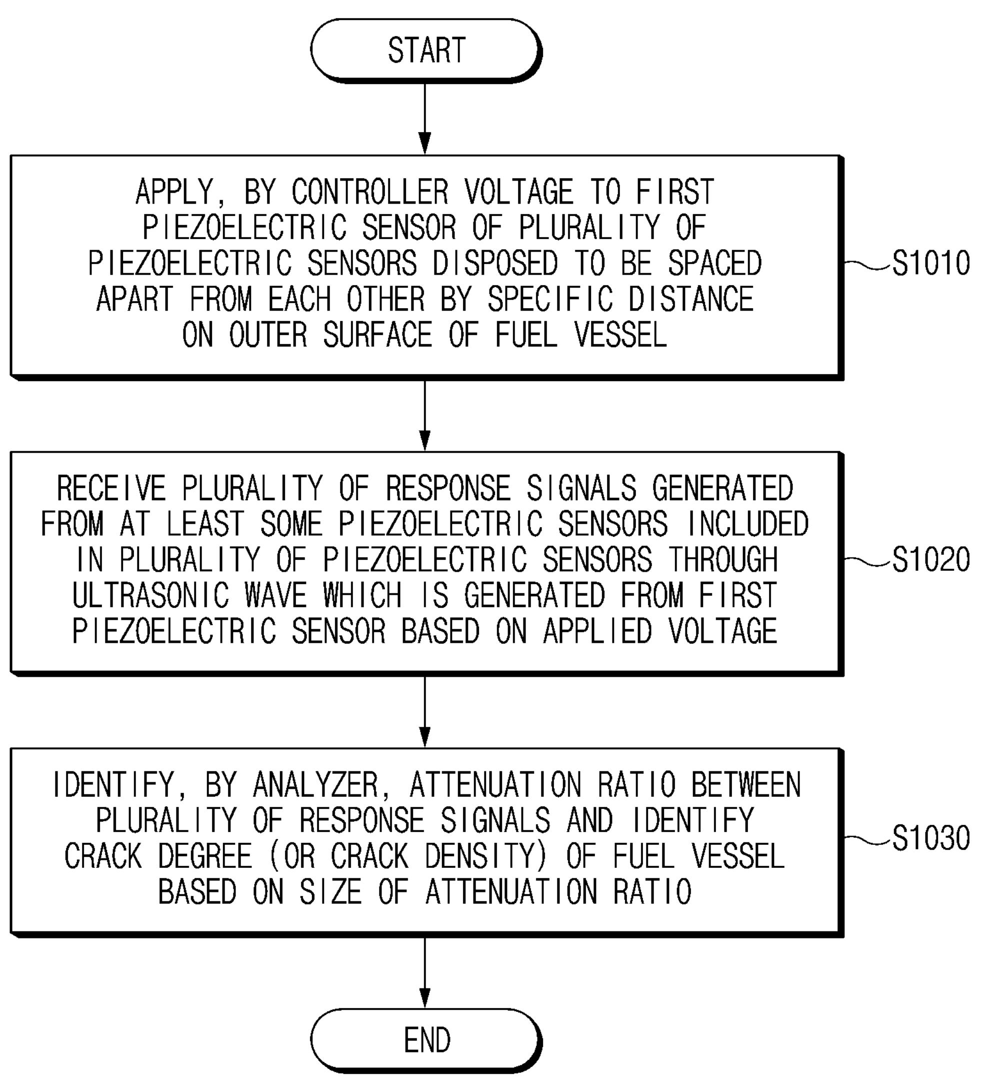
FIG. 10 is a flowchart illustrating an operation of a system for inspecting a fuel vessel, according to an embodiment of the present disclosure.

FIG. 10 is a flowchart illustrating an operation of a fuel vessel inspection system, according to an embodiment of the present disclosure.

According to an embodiment, the fuel vessel inspection system (e.g., the fuel vessel inspection system of FIG. 3) may perform the operations illustrated in FIG. 10. For example, at least some (e.g., the controller 301 and/or the analyzer 302) of the components included in the fuel vessel inspection system may be set to perform the operations of FIG. 10.

Hereinafter, according to an embodiment, operations of S1010 to S1030 may be sequentially performed, and do not need to be essentially sequentially performed. For example, the sequence of the operations may be changed, or at least two operations may be performed in parallel. In addition, in the following description made with reference to FIG. 10, the description corresponding to the above description or the duplication of the above description may be described in brief or omitted.

According to an embodiment, the controller may apply a voltage to the first piezoelectric sensor of the plurality of piezoelectric sensors disposed to be spaced apart from each other by a predetermined distance on an outer surface of the fuel vessel (S1010).

For example, the plurality of piezoelectric sensors may include the first piezoelectric sensor (e.g., the first piezoelectric sensor S0 in FIG. 2) and a second piezoelectric sensor (e.g., the fourth piezoelectric sensor S3 in FIG. 2) which is spaced apart from the first piezoelectric sensor by a longer (e.g., the longest) distance as compared to the other piezoelectric sensors. For example, the angular distance between the first piezoelectric sensor and the second piezoelectric sensor may be less than 180 degrees, when viewed based on the central point (e.g., the central point 225 of FIG. 2) of a plan having a hydrogen inlet of the fuel vessel For example, the controller may transmit an applied voltage to the first piezoelectric sensor through a cable. For example, the cable may be placed between the strap (e.g., the strap 250 in FIG. 2) and the plurality of piezoelectric sensors to transmit and receive a signal between the controller and the plurality of piezoelectric sensors.

According to an embodiment, the controller may receive a plurality of response signals generated from at least some piezoelectric sensors included in the plurality of piezoelectric sensors, through an ultrasonic wave which is generated from the first piezoelectric sensor based on the applied voltage (S1020).

For example, the first piezoelectric sensor may generate an ultrasonic wave based on the applied voltage transmitted from the controller. In this case, the generated ultrasonic wave may be transmitted to at least a part of piezoelectric sensors included in a plurality of piezoelectric sensors except the first piezoelectric sensor.

For example, the controller may receive the plurality of response signals generated from at least some piezoelectric sensors (e.g., the second piezoelectric sensor, the third piezoelectric sensor, and the fourth piezoelectric sensor) included in the plurality of piezoelectric sensors, based on that the ultrasonic wave is transmitted from the first piezoelectric sensor.

According to an embodiment, the analyzer may identify an attenuation ratio between the plurality of response signals and identify the crack degree (or crack density) of the fuel vessel based on the size of the attenuation ratio (S1030).

For example, the analyzer may compare the reference attenuation ratio obtained through the hydraulic test in relation to a crack of the fuel vessel, and the attenuation ratio between the plurality of response signals, thereby identifying the crack density (or crack degree) of the fuel vessel.

For example, the analyzer may determine that the crack density made in the fuel vessel corresponds to a degree dangerous for using the fuel vessel, when the identified attenuation ratio exceeds the reference attenuation ratio.

An apparatus for inspecting a fuel vessel according to the present disclosure, a system including the same, and a method for the same have the following effects.

According to at least one of embodiments of the present disclosure, the information on the crack degree (e.g., the crack density) of the fuel vessel is collected in real time through the plurality of piezoelectric sensors including the composition material and attached to the outer portion of the fuel vessel, thereby providing the environment for the safe use of the fuel vessel.

In addition, according to at least one of embodiments of the present disclosure, the plurality of piezoelectric sensors may be easily attached to the surface of the fuel vessel through the attaching material (e.g., polytetrafluoroethylene layer), and the strap may be fixed through the clamp, thereby stably and consecutively providing the inspection system.

Further, according to at least one of embodiments of the present disclosure, there may be provided the inspection system for identifying the state of the deterioration of the fuel vessel, which actually occurs as the fuel filling into the fuel vessel is repeated, in real time regardless of time based on the attenuation ratio between the radiation signals of the plurality of piezoelectric sensors while monitoring the structure integrity of the fuel vessel.

Besides, a variety of effects directly or indirectly understood through the disclosure may be provided.

The above description is merely an example of the technical idea of the present disclosure, and various modifications and modifications may be made by one skilled in the art without departing from the essential characteristic of the invention.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for inspecting a fuel vessel, the apparatus comprising:

a strap configured to surround an outer surface of the fuel vessel and fixed to the outer surface through at least one joint part;

a plurality of piezoelectric sensors interposed between the outer surface of the fuel vessel and the strap, and spaced apart from each other by a predetermined distance along the strap;

a cable electrically connected to the plurality of piezoelectric sensors; and a controller configured to apply a voltage to a first piezoelectric sensor of the plurality of piezoelectric sensors through the cable and to receive a plurality of response signals generated from the plurality of piezoelectric sensors, respectively, wherein the first piezoelectric sensor of the plurality of piezoelectric sensors is configured to transmit a signal generated based on receiving the applied voltage, to remaining piezoelectric sensors of the plurality of piezoelectric sensors, wherein a second piezoelectric sensor of the plurality of piezoelectric sensors is spaced apart from the first piezoelectric sensor by a longer distance than other piezoelectric sensors of the plurality of piezoelectric sensors, wherein an angular distance between the first piezoelectric sensor and the second piezoelectric sensor is less than 180 degrees, when viewed based on a central point of a plan having a hydrogen inlet of the fuel vessel, and wherein the controller includes:

a band pass filter to filter the plurality of response signals;

at least one amplifier to amplify at least one of the applied voltage, the plurality of response signals, or a combination of the applied voltage or the plurality of response signals;

a signal processor to perform signal processing for the plurality of response signals; and a power module to provide the applied voltage.

2. The apparatus of claim 1, further comprising:

a polytetrafluoroethylene (PTFE) layer disposed on the outer surface of the fuel vessel, and including a plurality of openings spaced apart from each other to mount the plurality of piezoelectric sensors.

3. The apparatus of claim 2, wherein the plurality of openings are provided in one surface of the PTFE layer making contact with the outer surface of the fuel vessel.

4. The apparatus of claim 3, wherein the cable is interposed between the strap and the plurality of piezoelectric sensors.

5. A vehicle comprising the apparatus of claim 1.

6. A system for inspecting a fuel vessel, the system comprising:

a plurality of piezoelectric sensors disposed on an outer surface of the fuel vessel, spaced apart from each other by a predetermined distance, and fixed to the outer surface of the fuel vessel through a strap configured to surround the outer surface of the fuel vessel;

a controller electrically connected to the plurality of piezoelectric sensors to apply a voltage to a first piezoelectric sensor of the plurality of piezoelectric sensors, and to receive a plurality of response signals generated to correspond to the applied voltage from at least some piezoelectric sensors of the plurality of piezoelectric sensors; and an analyzer to receive the plurality of response signals from the controller, identify an attenuation ratio between the plurality of response signals, and identify a crack density of the fuel vessel based on a size of the attenuation ratio.

7. The system of claim 6, wherein the first piezoelectric sensor is configured to transmit, to the at least some piezoelectric sensors included in the plurality of piezoelectric sensors, an ultrasonic wave generated based on the voltage applied from the controller, and wherein the controller is configured to receive the plurality of response signals generated from the at least some piezoelectric sensors included in the plurality of piezoelectric sensors, based on the ultrasonic wave transmitted from the first piezoelectric sensor.

8. The system of claim 6, wherein the controller includes:

a band pass filter to filter the plurality of response signals;

at least one amplifier to amplify at least one of the applied voltage, the plurality of response signals, or a combination of the applied voltage or the plurality of response signals;

a signal processor to perform signal processing for the plurality of response signals; and a power module to provide the applied voltage.

9. The system of claim 6, wherein the plurality of piezoelectric sensors include:

the first piezoelectric sensor and a second piezoelectric sensor spaced apart from the first piezoelectric sensor by a longer distance than other piezoelectric sensors of the plurality of piezoelectric sensors, and wherein an angular distance between the first piezoelectric sensor and the second piezoelectric sensor is less than 180 degrees, when viewed based on a central point of a plan having a hydrogen inlet of the fuel vessel.

10. The system of claim 6, wherein the plurality of piezoelectric sensors are mounted in a plurality of openings provided in one surface of a polytetrafluoroethylene (PTFE) layer disposed on the outer surface of the fuel vessel and making contact with the outer surface of the fuel vessel.

11. The system of claim 6, wherein the controller is configured to:

transmit the applied voltage to the first piezoelectric sensor; and receive the plurality of response signals from the at least some piezoelectric sensors of the plurality of piezoelectric sensors through a cable electrically connected to the plurality of piezoelectric sensors.

12. The system of claim 11, wherein the cable is interposed between the strap and the plurality of piezoelectric sensors.

13. The system of claim 6, wherein the analyzer is configured to compare a reference attenuation ratio obtained through a hydraulic test in relation to a crack of the fuel vessel, and an attenuation ratio between the plurality of response signals, such that a crack density of the fuel vessel is identified.

14. A system for inspecting a vehicle comprising the system of claim 6.

15. A method for inspecting a fuel vessel, the method comprising:

applying, by a controller, a voltage to a first piezoelectric sensor of a plurality of piezoelectric sensors disposed to be spaced apart from each other by a predetermined distance on an outer surface of the fuel vessel;

receiving, by the controller, a plurality of response signals generated from at least some piezoelectric sensors included in the plurality of piezoelectric sensors, by an ultrasonic wave generated from the first piezoelectric sensor, based on the applied voltage; and identifying, by an analyzer, an attenuation ratio between the plurality of response signals to identify a crack density of the fuel vessel based on a size of the attenuation ratio.

16. The method of claim 15, wherein the plurality of piezoelectric sensors include:

the first piezoelectric sensor and a second piezoelectric sensor spaced apart from the first piezoelectric sensor by a longer distance than other piezoelectric sensors of the plurality of piezoelectric sensors, and wherein an angular distance between the first piezoelectric sensor and the second piezoelectric sensor is less than 180 degrees, when viewed based on a central point of a plan having a hydrogen inlet of the fuel vessel.

17. The method of claim 15, wherein the identifying of the crack density of the fuel vessel, by the analyzer, includes:

comparing a reference attenuation ratio obtained through a hydraulic test in relation to a crack of the fuel vessel, with an attenuation ratio between the plurality of response signals, such that a crack density of the fuel vessel is identified.

* * * * *